(12) United States Patent
Nunna et al.

(10) Patent No.: US 11,206,319 B2
(45) Date of Patent: Dec. 21, 2021

(54) INTERFACE, VEHICLE CONTROL SYSTEM AND NETWORK DEVICE FOR COMBINING VEHICLE CONTROL WITH COMMUNICATION SERVICES

(71) Applicant: Huawei Technologies Co., Ltd., Shenzhen (CN)

(72) Inventors: Swaroop Nunna, Munich (DE); Karthikeyan Ganesan, Munich (DE); Holger Rosier, Munich (DE); Josef Eichinger, Munich (DE); Markus Martin Dillinger, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/435,258

(22) Filed: Jun. 7, 2019

(65) Prior Publication Data

US 2019/0297173 A1    Sep. 26, 2019

Related U.S. Application Data

(63) Continuation of application No. PCT/EP2016/080506, filed on Dec. 9, 2016.

(51) Int. Cl.
*H04L 29/08* (2006.01)
*H04L 29/06* (2006.01)

(52) U.S. Cl.
CPC .............. *H04L 69/08* (2013.01); *H04L 67/12* (2013.01)

(58) Field of Classification Search
CPC ....................................................... H04L 69/08
See application file for complete search history.

(56) References Cited

U.S. PATENT DOCUMENTS 8,705,527 B1 * 4/2014 Addepalli ........... H04L 43/0811
370/389
2002/0110146 A1    8/2002 Thayer et al.
(Continued)

FOREIGN PATENT DOCUMENTS

CN          201134028 Y      10/2008
CN          201690463 U      12/2010
(Continued)

OTHER PUBLICATIONS

"H.VGP-FAM:Start work and proposed initial text;C 677," ITU-T Draft,Study Period 2009-2012, International Telecommunication Union, Geneva CH, pp. 1-8, XP017570933, International Union of Telecommunication—Geneva, Switzerland (Nov. 4, 2011).
(Continued)

*Primary Examiner* — Adnan M Mirza
(74) *Attorney, Agent, or Firm* — Leydig, Voit & Mayer, Ltd.

(57) ABSTRACT

An interface between a vehicle control system and a communication system is provided. The interface comprises an input configured to receive data from at least one of the vehicle control system and the communication system. The interface comprises a conversion layer configured to translate the received data into a format that is comprehensible to the other of the vehicle control system and the communication system. The interface also comprises an output configured to output the translated data to the other of the vehicle control system and the communication system. This enables both the vehicle control system and communication system to understand the other while still retaining their individual autonomy.

12 Claims, 7 Drawing Sheets

(56) References Cited

U.S. PATENT DOCUMENTS

| | | | |
|---|---|---|---|
| 2013/0238807 A1 | 9/2013 | Wakikawa et al. | |
| 2017/0043731 A1 | 2/2017 | Kim et al. | |
| 2018/0018605 A1* | 1/2018 | Light-Holets | G06Q 20/405 |
| 2019/0129440 A1* | 5/2019 | Borhan | G05D 1/0088 |

FOREIGN PATENT DOCUMENTS

| | | |
|---|---|---|
| CN | 201717878 U | 1/2011 |
| CN | 102542803 A | 7/2012 |
| GB | 2536718 A | 9/2016 |
| JP | 2006502601 A | 1/2006 |
| JP | 2006352191 A | 12/2006 |
| JP | 2009159098 A | 7/2009 |
| JP | 2011035721 A | 2/2011 |
| JP | 2013186121 A | 9/2013 |
| JP | 2014003355 A | 1/2014 |
| JP | 2016024613 A | 2/2016 |
| JP | 2018513628 A | 5/2018 |
| KR | 101664734 B1 | 10/2016 |
| WO | 2014048486 A1 | 4/2014 |
| WO | 2016106639 A1 | 7/2016 |

OTHER PUBLICATIONS

"3rd Generation Partnership Project;Technical Specification Group Core Network and Terminals; AT command set for User Equipment (UE) (Release 14)," 3GPP TS 27.007 V14.1.0, pp. 1-332, 3rd Generation Partnership Project—Valbonne, France (Sep. 2016).

"Use of 3GPP system to support Non-3GPP RAT V2X operation," 3GPP TSG-SA WG1 #75, San Francisco, USA, , S1-162049, pp. 1-4, 3rd Generation Partnership Project—Valbonne, France (Aug. 22-26, 2016).

"Smarter: Use case for Automotive: Automated Cooperative Driving," 3GPP TSG-SA WG1 Ad-hoc on Smarter (5G), Vancouver, Canada, S1-153074, total 6 pages, 3rd Generation Partnership Project, Valbonne, France (Oct. 19-21, 2015).

JP/2019-530682, Office Action, dated Jul. 20, 2020.

\* cited by examiner

INTERFACE, VEHICLE CONTROL SYSTEM AND NETWORK DEVICE FOR COMBINING VEHICLE CONTROL WITH COMMUNICATION SERVICES

CROSS-REFERENCE TO RELATED APPLICATIONS

This application is a continuation of International Application No. PCT/EP2016/080506, filed on Dec. 9, 2016, the disclosure of which is hereby incorporated by reference in its entirety.

TECHNICAL FIELD

This disclosure relates to vehicle control systems and how they interface with communication systems.

BACKGROUND

Vehicle manufacturers are increasingly experimenting with incorporating functionality in their vehicles that relies on exchanging data with a mobile communication network. In particular, it is anticipated that future mobile communication networks will need to be able to support Intelligent Transportation Systems (ITS). This encompasses applications such as cooperative driving and fully autonomous driving. In the automotive industry, it is important that functions offered to the customer work with high reliability. It is also important that any system failure is detected before the user tries to apply any function that might be affected by the failure. This also allows the driver to be informed about the temporary non-availability of a function. These concepts offer a stark contrast to the "best-effort" approach that is typically taken by mobile communication networks. In particular, the scheduler in today's mobile communication networks usually has a degree of freedom to shape data traffic in time. This leads to high variance in data latency. Vehicle manufacturers often come across this effect when channel-dependent, proportionally fair scheduling is used by networks and their vehicles are subject to poor channel conditions due to their location. For example, poor channel conditions often exist on highways.

One illustrative example where the "best-effort" approach of mobile communication networks often leads to a poor result from the perspective of vehicle manufacturers is streaming internet radio: the high variance of data latency often leads to buffer underruns and thus to outages in playback. Consequently, vehicle manufacturers are generally sceptical about introducing streaming internet radio to the mass market.

One solution for overcoming these problems would be for the vehicle manufacturer to insist on particular quality-of-service (QoS) and set requirements on the radio layer that match the requirements the vehicle manufacturer has for a particular function. Requirements such as these are expected to be very strict, which will result in the mobile communications provider having to permanently set aside resources for meeting them. This in turn decreases the efficiency of the mobile communication network.

It is an object of the disclosure to provide concepts for providing better integration between vehicle control systems and communication systems.

SUMMARY

The foregoing and other objects are achieved by the features of the independent claims. Further implementation forms are apparent from the dependent claims, the description and the figures.

According to a first aspect, an interface between a vehicle control system and a communication system is provided. The interface comprises an input configured to receive data from at least one of the vehicle control system and the communication system. It comprises a conversion layer configured to translate the received data into a format that is comprehensible to the other of the vehicle control system and the communication system. It also comprises an output configured to output the translated data to the other of the vehicle control system and the communication system. This enables both the vehicle control system and communication system to understand the other while still retaining their individual autonomy.

The input may be configured to receive data from the vehicle control system that defines a function that the vehicle control system intends to perform. The conversion layer may be configured to translate that data into a requirement for specific communication resources from the communication system. This assists the vehicle control system to request the resources that it needs, and enables the communication system to efficiently allocate resources where they are needed.

The conversion layer may be configured to translate that data into a requirement for specific communication resources that includes one or more of: resource scheduling, priority handling, quality of service and a mode of transmission. This enables the request for communication resources to be specific, which assists the communication system in allocating those resources.

The conversion layer may be configured to generate a request for the specific communication resources. The output may be configured to output that request to the communication system. This enables the interface to generate a message that can simply be transmitted by a transmitter in the vehicle.

The input may be configured to receive data from the communication system that includes one or more key performance indicators relating to a connectivity status of the communication system. This enables the interface to pass this information to the vehicle control system, where it can be usefully employed in the decision making process relating to controlling the vehicle.

The interface may be configured to facilitate a bidirectional exchange of information between the vehicle control system and the communication system. This enables both the vehicle control system and the communication system to improve their performance.

According to a second aspect, a method for conveying information between a vehicle control system and a communication system is provided. The method comprises receiving information from one of the vehicle control system and the communication system. It comprises translating the received information into a format that is comprehensible to the other of the vehicle control system and the communication system. The method also comprises outputting the translated information to the other of the vehicle control system and the communication system.

According to a third aspect, a non-transitory machine readable storage medium is provided having stored thereon processor executable instructions implementing a method for conveying information between a vehicle control system and a communication system. The method comprises receiving information from one of the vehicle control system and the communication system. It comprises translating the received information into a format that is comprehensible to the other of the vehicle control system and the communication system. The method also comprises outputting the translated information to the other of the vehicle control system and the communication system.

According to a fourth aspect, a vehicle control system for controlling a vehicle is provided. The vehicle control system comprises an interface configured to communicate data associated with the vehicle, wherein at least some of said data is intended to be transmitted via a communication system, and to receive data about a connectivity status of that communication system. It also comprises an evaluation unit configured to make a determination about an operation of the vehicle in dependence on the information received about the connectivity status of the communication system. This improves the operation of the vehicle control system.

The interface may be configured to receive data that defines a current and predicted future connectivity status of the communication system. The evaluation unit may be configured to make an assessment about an expected future safety of the vehicle in dependence on that data. This may improve the safety performance of the vehicle control system and help to avoid vehicle collisions.

The vehicle control system may comprise a controller that is configured to enable or disable a specific functionality of the vehicle control system dependence on the determination about the vehicle operation. This allows the vehicle control system to feed information about the communication services available to it into how it controls the vehicle.

The vehicle control system may comprise a controller that is configured to adjust its control of the vehicle in dependence on the determination about the vehicle operation. This allows the vehicle control system to feed information about the communication services available to it into how it controls the vehicle.

The vehicle control system may comprise a predictor configured to predict an expected path of the vehicle. The interface may be configured to communicate that expected path to the communication system. This can help the communication system to decide what communication resources should be assigned to the vehicle control system in future.

The interface may be configured to cause a specific communication resource to be requested from the communication system responsive to an intention that the vehicle control system perform a particular function. This helps to tailor the allocation of communication resources to vehicle need, meaning that resources can be allocated more efficiently.

According to a fifth aspect, a method for controlling a vehicle is provided. The method comprises communicating data associated with the vehicle, wherein at least some of said data is intended to be transmitted via a communication system, and receiving data about a connectivity status of that communication system. It also comprises an making a determination about an operation of the vehicle in dependence on the information received about the connectivity status of the communication system.

According to a sixth aspect, a non-transitory machine readable storage medium is provided having stored thereon processor executable instructions implementing a method for controlling a vehicle is provided. The method comprises communicating data associated with the vehicle, wherein at least some of said data is intended to be transmitted via a communication system, and receiving data about a connectivity status of that communication system. It also comprises making a determination about an operation of the vehicle in dependence on the information received about the connectivity status of the communication system.

According to a seventh aspect, network device is provided that forms part of a communication system that is configured to facilitate the communication of data by a vehicle control system. The network device comprises a predictor configured to predict a future connectivity status of the communication system. It also comprises a communication unit configured to forward that prediction to the vehicle control system. This helps to improve the operation of the vehicle control system by providing it with information that it can feed into its decision-making processes relating to how it controls the vehicle.

The network device may be configured to receive data from the vehicle control system; determine the vehicle control system's requirement for communication resources from the communication system in dependence on the received data. It may also be configured to allocate communication resources of the communication system to the vehicle control system in dependence on the determined requirement. This helps the network device to allocate resources efficiently.

The network device may be configured to receive data from the vehicle control system that includes one or more of: a request from the vehicle control system for specific communication resources; a current or predicted operation of the vehicle; a position of the vehicle; and an expected future path of the vehicle. This information helps the network device to assign communication resources appropriately and efficiently.

According to an eighth aspect, a method is provided for facilitating the communication of data by a vehicle control system. The method comprises predicting a future connectivity status of the communication system. It also comprises forwarding that prediction to the vehicle control system.

According to a ninth aspect, a non-transitory machine readable storage medium is provided having stored thereon processor executable instructions for implementing a method for facilitating the communication of data by a vehicle control system. The method comprises predicting a future connectivity status of the communication system. It also comprises forwarding that prediction to the vehicle control system.

BRIEF DESCRIPTION OF THE DRAWINGS

The present disclosure will now be described by way of example with reference to the accompanying drawings. In the drawings.

DETAILED DESCRIPTION

Figure 1:
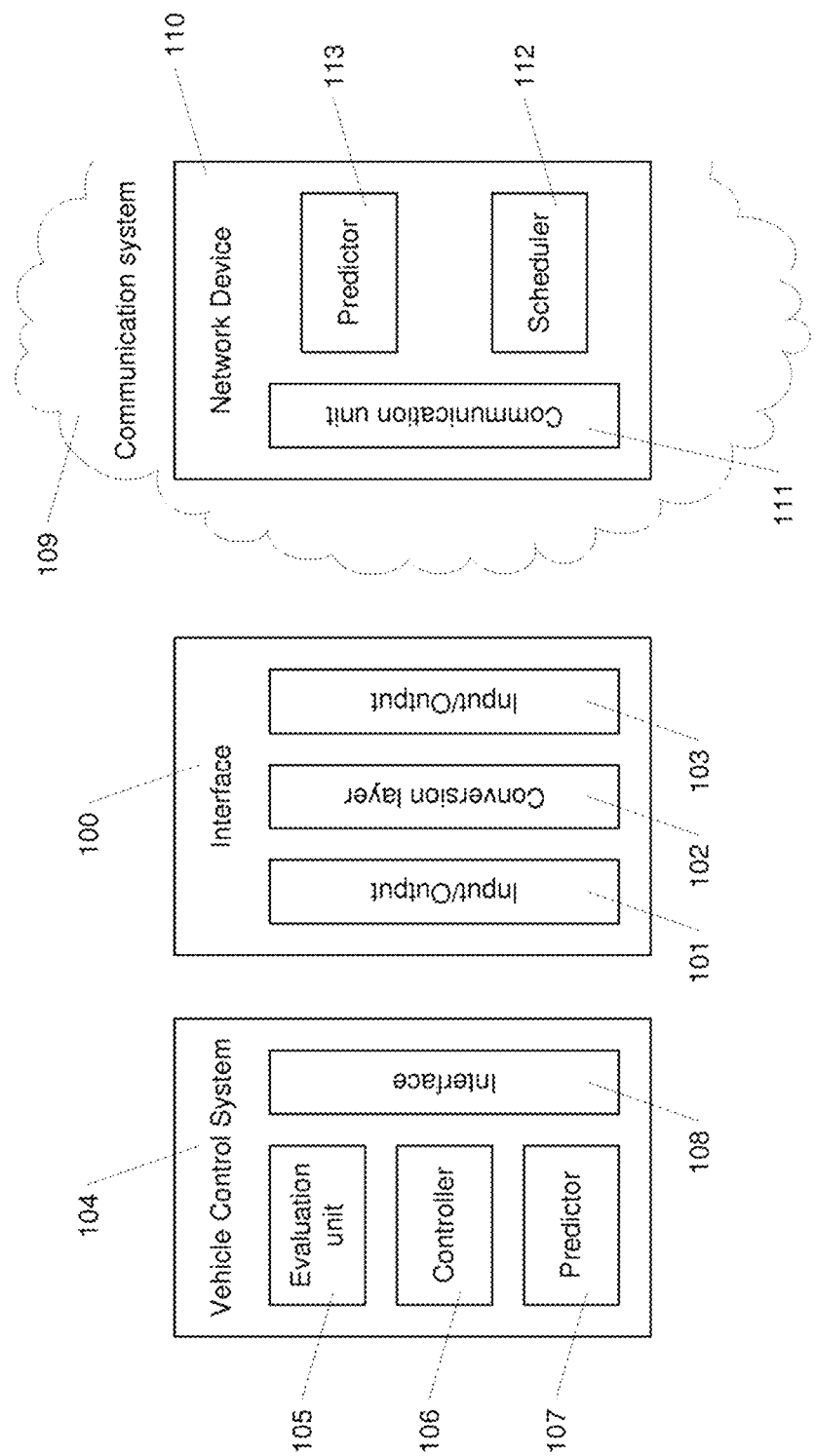
FIG. 1 shows an example of a vehicle control system, a network device and an interface according to embodiments of the disclosure.

FIG. 1 shows an example of an interface 100 between a vehicle control system 104 and a communication system 109. The term "communication system" is used herein to refer to the communication system as a whole and/or to any individual device that forms part of the communication system. It therefore encompasses any device or component that is configured to operate in accordance with any specific commands, protocols or functions that govern that communication system. A device that is part of the communication system is thus able to communicate (in the sense of having a dialogue that is comprehensible to both parties) with other devices in the communication system. Such devices include user equipment, modems, base stations, core network devices etc.

This interface 100 will typically be implemented in a vehicle. The vehicle control system 104 will similarly be implemented in the vehicle. The communication system 109 could be implemented in the vehicle or externally to the vehicle. For example, in some implementations the communication system may be implemented by some firmware in the vehicle that represents a user equipment (UE) from the perspective of the "network part" of the communication system (such as a base station). In other implementations, the term "communication system" may refer to device that is external to the vehicle, such as a base station or network device 110.

The interface 100 comprises an input 101, 103, a conversion layer 102 and an output 101, 103. The input is configured to receive data from the vehicle control system 104 or the communication system 109, or preferably both. The conversion layer is configured to translate any data that the interface receives from the vehicle control system or the communication system into a format that is comprehensible to the other of the vehicle control system and the communication system. The output is configured to output the translated data to either the vehicle control system or the communication system, depending on which entity the data is intended for.

The interface can be considered as a functional/logical entity that connects the domain of the vehicle control system 104 with the domain of the communication system 109. It is configured to enable the negotiation and provision of communication resources by the communication system and the vehicle control system, while allowing both the communication system and the vehicle control system to retain domain autonomy.

Figure 2:
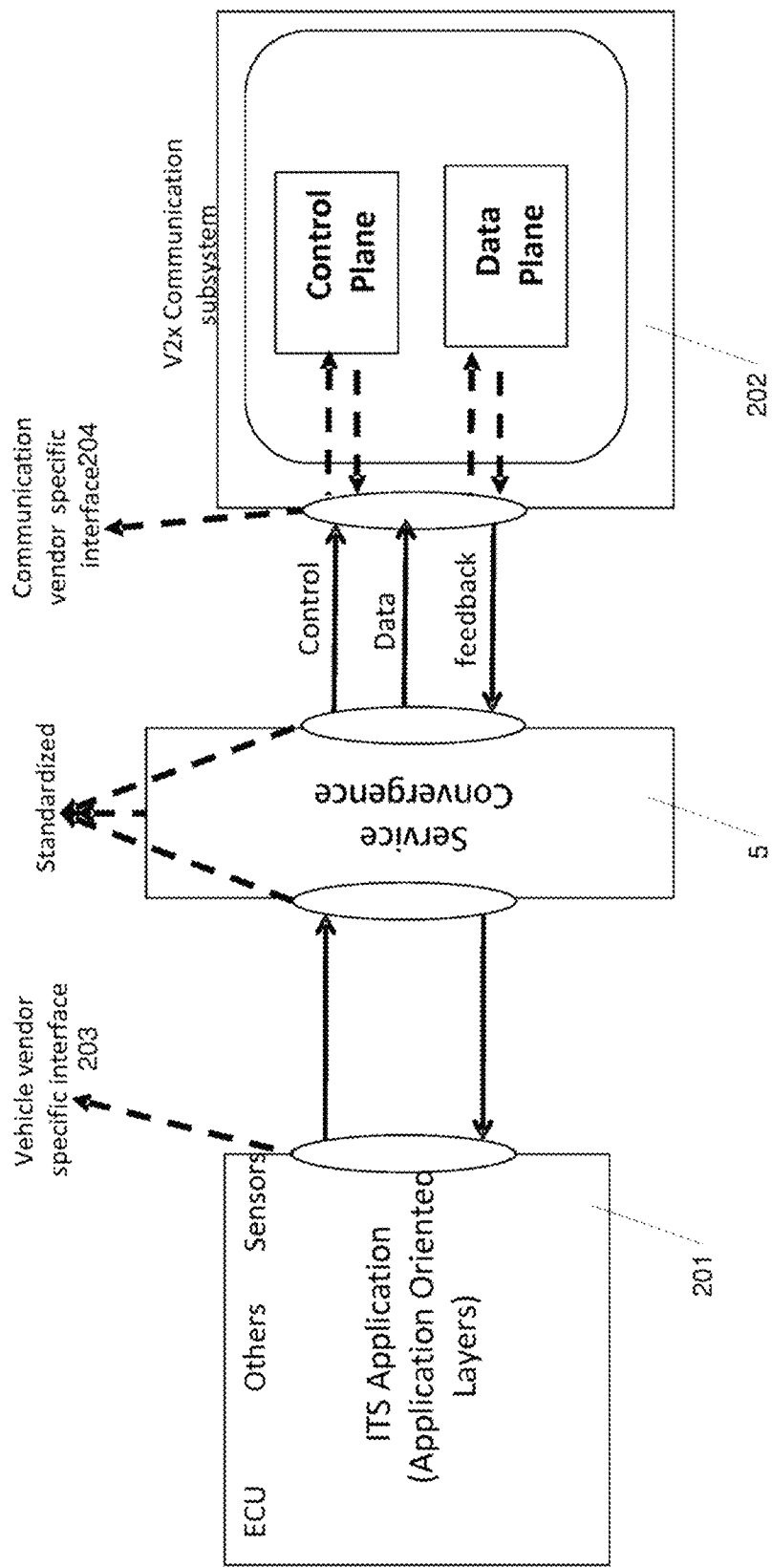
FIG. 2 shows a more detailed example of an interface according to an embodiment of the disclosure.

The interface 100 facilitates bidirectional communication between the vehicle control system 104 and the communication system 109 by translating data from each entity into a format that the other will understand. This is shown in FIG. 2, which illustrates a specific example in which the vehicle control system 104 is implemented by an ITS application 201 and the communication system is implemented by a V2x communication subsystem 202. Each of these entities is configured to communicate via an interface 203, 204, which in many cases will be specific to the particular vendor that supplied that entity.

FIG. 2 represents just one example of how the interface in FIG. 1 might be implemented in practice. The interface is not limited to this specific implementation and can be configured to interface between any vehicle control system and communication system; it is not limited to the specific examples shown in FIG. 2. The functionality of the service convergence layer 205 described below is also generally applicable to interface 100 and is not limited to the specific implementation shown in FIG. 2.

Service convergence layer 205 is an example of the convergence layer in interface 100. It is configured to receive data from the application oriented layers of the ITS application 201 and standardise it into a format that is appropriate for the control and data planes of the V2x communication subsystem. That data may include measurement data relating to one or more functions of the vehicle. For example, it may include data that originates from an engine control unit (ECU), various sensors or other sources. The service convergence layer may be configured to format that data into a data message with a sensor data payload for being transmitted by the V2x communication subsystem 202. In some scenarios, the data output by the ITS application will be control data, e.g. data that represents some decision, interpretation, intention or prediction that the ITS application has come to, often based on data received from the sensors and other sources. The service convergence layer may be configured to format that data into a control message having a payload that includes the meta-information provided by the ITS application. In other examples the service convergence layer may not format the actual message but only the payload data, with the message itself being formed by the V2x communication subsystem.

The service convergence layer 205 provides a similar service for data it receives from the control and data planes of the V2x communication subsystem, by translating that data into a format that is appropriate for the application oriented layers of the ITS application. In FIG. 2 the service convergence layer is shown as receiving feedback from the communication system. That feedback could include any data that the communication system judges the ITS application would find useful, such as current and predicted connectivity status, KPIs, quality of service etc.

Figure 4:
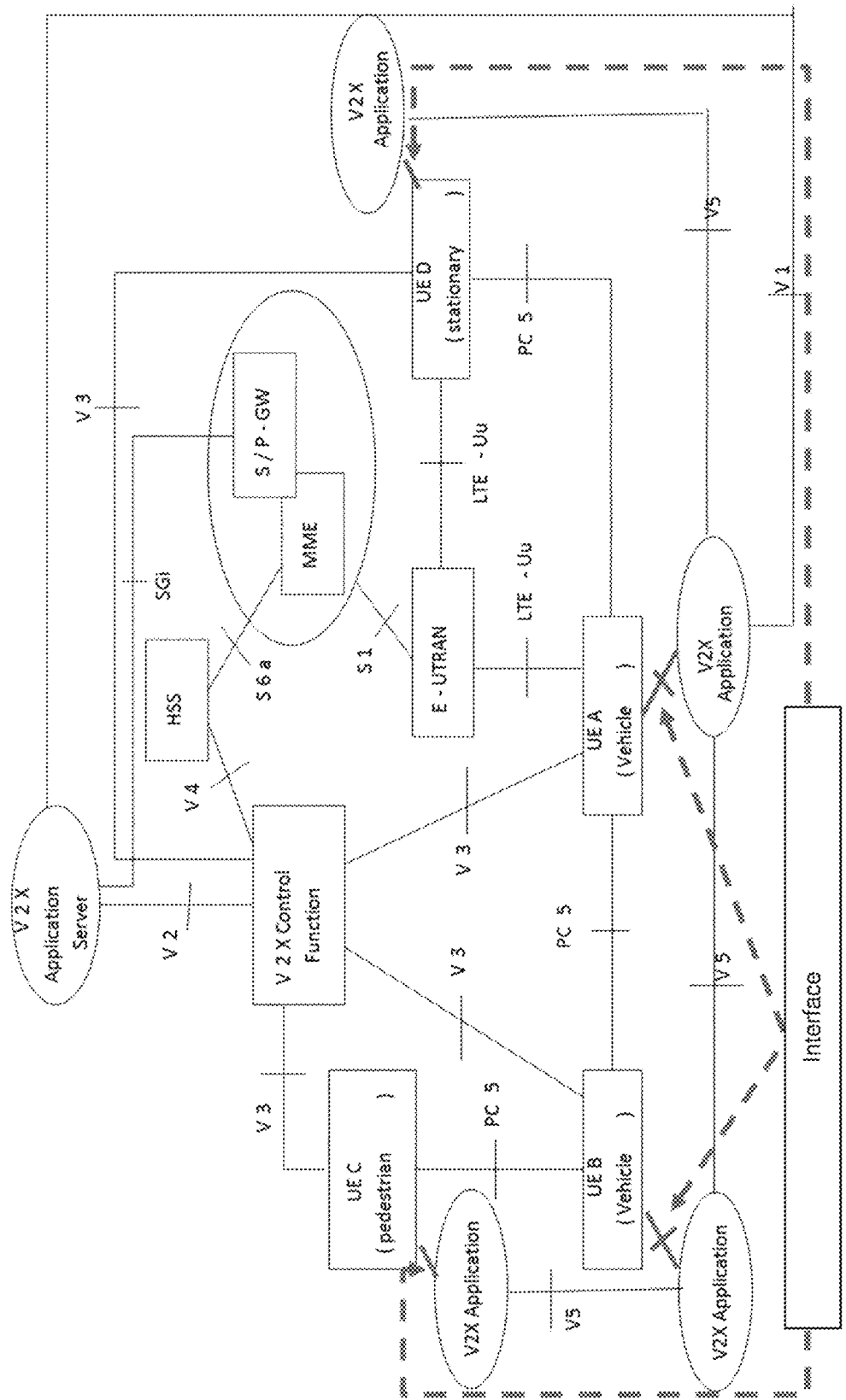
FIG. 4 shows an interface according to an embodiment of the disclosure incorporated within a 3GPP architecture.

In one implementation, the interface 100 that is shown in FIG. 1 can be used to fill a gap in currently proposed 3GPP architectures by interfacing between a V2X Modem/V2X Communication System and a V2X application in ITS. This is shown in FIG. 4.

Returning to FIG. 1, the vehicle also includes a vehicle control system 104. This system includes an interface 108 and an evaluation unit 105. The interface is configured to communicate data associated with the vehicle. That data might include sensor measurements, a predicted path, the vehicle's location etc. At least some of the data is intended to be transmitted via the communication system. The interface may be configured to forward that data to interface 100. The control system interface is also configured to receive data about a connectivity status of the communication system, which it passes to the evaluation unit. The evaluation unit uses this data to make a determination about an operation of the vehicle. This determination might relate to any function of the vehicle and can cause the control system to enable or disable a particular functionality. In some implementations, the determination will assess the current and future safety of the vehicle. The determination can also cause the control system to adjust how it controls the vehicle, e.g. the vehicle control system may comprise a controller 106 for enabling or disabling a specific functionality of the vehicle control system dependence on the determination. Examples of such functionality include braking, acceleration and steering. The vehicle control system may also cause a specific communication resource to be requested from the communication system if it determines that it is going to perform a particular function, e.g. changing direction or speed.

In some implementations, the vehicle control system 104 may comprise a predictor 107. The predictor is configured to predict an expected path of the vehicle. This expected path can be used by the vehicle control system to assess a future safety of the vehicle. It may also be communicated to the communication system, which may be configured to adapt a current or future resource allocation that is assigned to the vehicle control system in dependence on that vehicle's predicted path.

Figure 3:
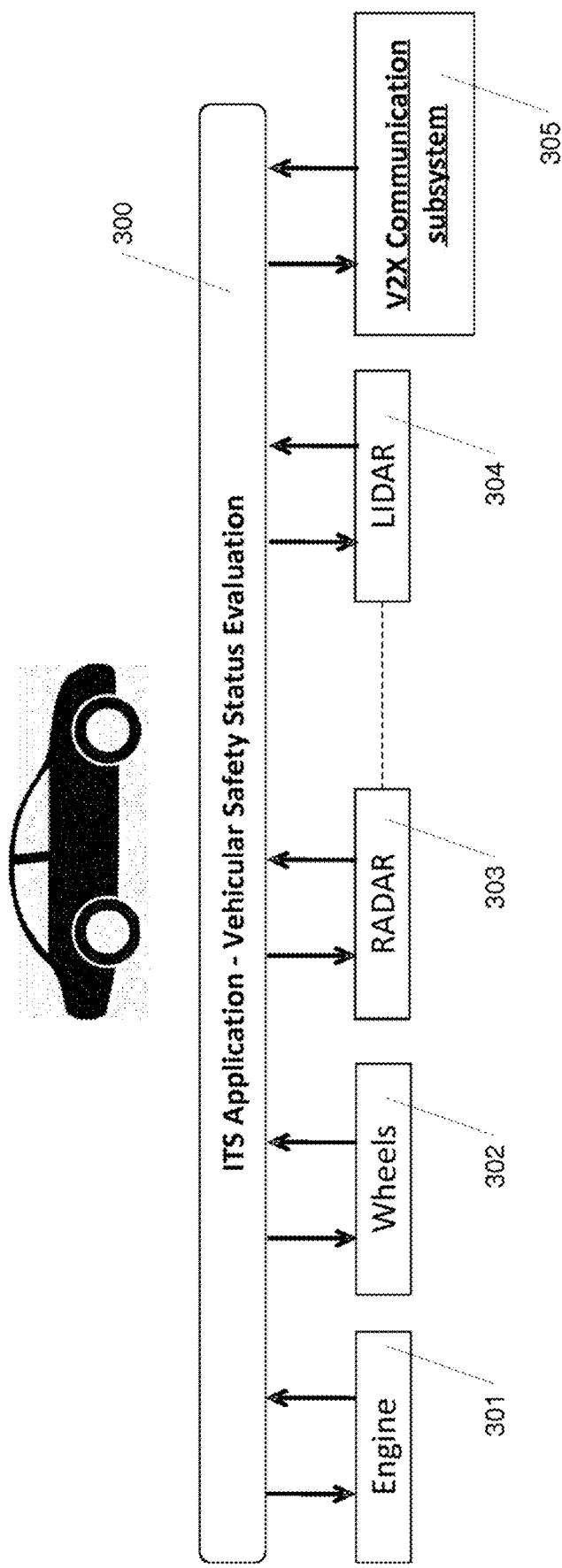
FIG. 3 shows a more detailed example of a vehicle control system according to an embodiment of the disclosure.

A specific example of a vehicle control system 300 is shown in FIG. 3. In this example the vehicle control system is an Intelligent Transportation System (ITS). It is configured to receive data relating to various components in the vehicle, such as the engine and wheels (301, 302). It is also configured to receive data from various presence detection means in the vehicle, which may be configured to detect the presence of surrounding objects such as other vehicles. In FIG. 3, these presence detection means are represented by a Radio Detection and Ranging (RADAR) device 303 and a Light Detection and Ranging (LIDAR) device 304. The vehicle control system is also configured to receive data from a V2x communication subsystem 305. In one implementation this data is received via an interface, such as interface 100, so that the vehicle control system is able to interpret the information that is provided to it about the communication system and its current capabilities.

Returning to FIG. 1, the communication system includes a network device 110. The network device could, for example, be implemented in a base station or a device within the core network The network device includes a predictor 113 and a communication unit 111. The predictor is configured to predict a future connectivity status of the communication system and the communication unit is configured to forward that prediction to the vehicle control system. The network device may also include a scheduler 112 that is configured to determine the vehicle control system's requirement for communication resources in dependence on information that it has forwarded to the communication system (e.g. via interface 100). The scheduler then allocates communication resources of the communication system to the vehicle control system in dependence on the determined requirement.

The structures shown in FIG. 1 (and all the block apparatus diagrams included herein) are intended to correspond to a number of functional blocks. This is for illustrative purposes only. FIG. 1 is not intended to define a strict division between different parts of hardware on a chip or between different programs, procedures or functions in software. In some embodiments, some, or all, of the translation, assessment and prediction techniques described herein will be coordinated wholly or partly by a processor acting under software control. That software can be embodied in a non-transitory machine readable storage medium having stored thereon processor executable instructions for implementing some, or all, of the translation, assessment and prediction techniques described herein.

The interface 100, vehicle control system 104 and network device 110 shown in FIG. 1 may be implemented independently of each other. They may also be implemented together by exchanging various pieces of data. Some example scenarios in which the interface, vehicle control system and network device may be beneficially employed (either independently or in combination) are described below.

In general, the components and techniques described herein improve the performance of both the communication system and vehicle control system by facilitating real-time communication between the two. There are two important consequences that result from this. First the vehicle control system can translate a situation that it faces in terms of controlling the vehicle into specific requirements for communication resources. Second the communication system can feedback its current and predicted ability to provide communication resources to the vehicle control system, enabling the vehicle control system to adapt its control of the vehicle. This facilitates real-time negotiation and compromise between the vehicle control system and the communication system.

Figure 5:
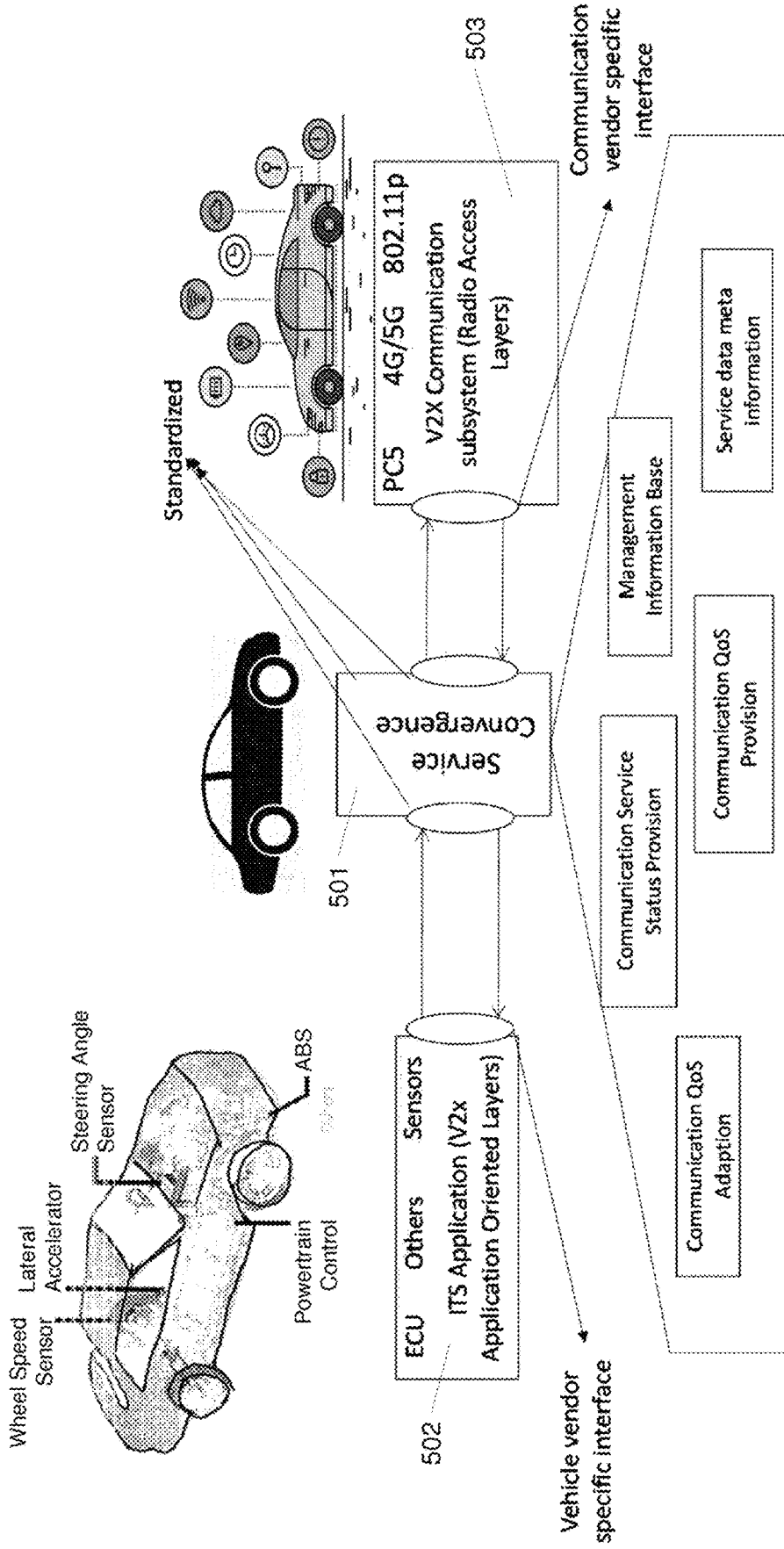
FIG. 5 shows an example of a vehicle control system, a network device and an interface according to a specific embodiment of the disclosure.

An example is shown in FIG. 5. The service convergence interface 501 provides a bi-directional interface between a vehicle control system 502 (ITS Application V2x subsystem in this example) and a communication system 503 (V2x communication subsystem in this example).

The vehicle control system 502 can indicate to the interface that it intends to perform a function. The interface can translate that intended function into a requirement for specific communication resources, which the communication system will be able to understand. The interface thus provides the means for the communication system to "understand" meta-data and context information by translating that data into specific service requests. The vehicle control system also requests quality-of-service parameters from the communication system 503. In other words, the vehicle control system may request not only specific communication resources from the communication system, but also guarantees that those resources will provide a minimum quality of service. These quality-of-service parameters may be defined by a function that the vehicle control system wants to perform, i.e. a way in which it wants to control the vehicle. The vehicle control system can update these parameters whenever it has access to the network. The vehicle control system may also provide the communication system with its own estimate of future channel conditions, future communication requirements realisations, the current or predicted position of the vehicle and/or the current or predicted path of the vehicle. The vehicle control system is preferably configured in such a way that it can react to current and upcoming changes in channel quality. For example, the vehicle control system might enable/disable certain functionality or control the speed of the vehicle/distance between the vehicle and other vehicles in dependence on information received from the communication system.

The communication system (represented generally by V2x communication subsystem 503 in FIG. 5) adapts the communication services that it provides in dependence on input from the vehicle control system. This may involve the communication system adapting parameters such as resource scheduling, priority handling, quality of service (both future and current) and/or mode of transmission (e.g. multicast or broadcast, over a PC5 or cellular network etc.). In one example, the communication system may adapt the communication protocol that it assigns the vehicle control system in dependence on the data it receives from it. For example, if both 4G and 5G network functionality is available, 4G could provide a "best effort" service whereas 5G could provide a guaranteed quality of service. The communication system decides what resources to allocate to the vehicle control system in dependence on the resources available to it, a perceived need of that vehicle control system (e.g. from a safety perspective) and a perceived need of other users.

The communication system informs the vehicle control system about any resources that have been allocated to it. It also which provides the vehicle control system with information about current and an anticipated future connectivity status of the communication system. For example, the communication system can provide the vehicle control system with real-time and predicted communication KPIs, achievable QoS parameters and inform it about the current channel and network status.

The interface (service convergence layer 501) provides a communication service abstraction by translating vendor specific functions and measurement reports to a common facility interface. It provides a means by which the communication system can understand sensor data, meta-data, context information relating a requested communication resource or service from the vehicle control system. It also provides a means by which the vehicle control system can understand real-time and predicted communication KPIs, achievable QoS parameters and channel and network status information from the communication system. In doing this, the interface enables a management information base that acquires performance measurements from the communication system, provides real-time performance measures to the vehicle control system, and provides a measure/probability of guaranteed service availability.

The bi-directional message exchange via the interface can be based on a request model or a subscription based model. For example, the vehicle control system may request that the communication system provide it information at periodic intervals during a service session. Alternatively, information may be provided on a request/response basis.

Figure 6:
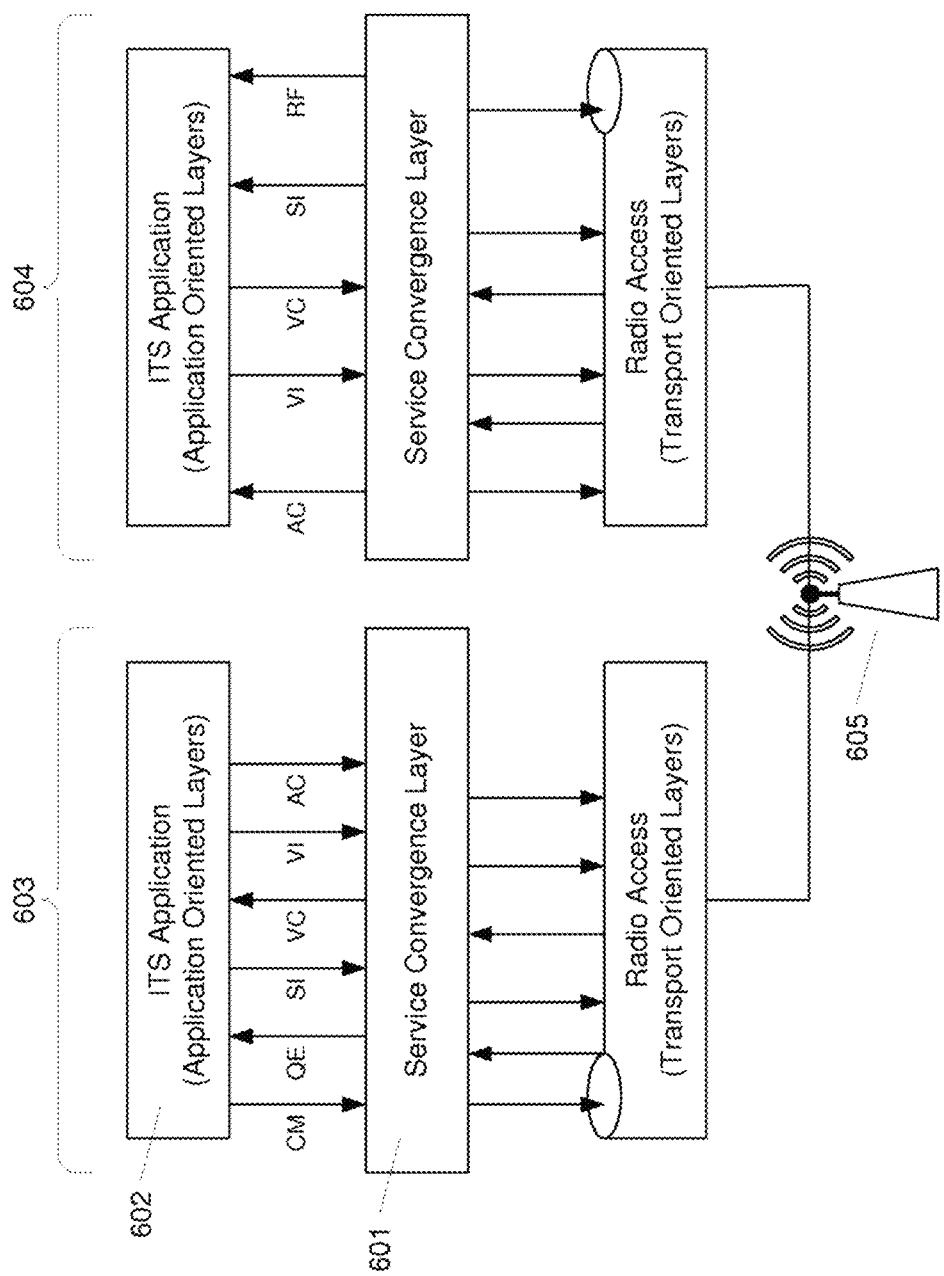
FIG. 6 shows an exchange of data between a vehicle control system and an interface.

FIG. 6 shows some examples of specific data types that may be communicated to and from the vehicle control system 602 via the convergence layer 601 of the interface. these include data that may be included in the payload or ad hoc or connection-based communications such as:

Sensor Information (SI), which can be raw or pre-processed
  Application Control (AC), which relates to the use case application in the target vehicle
Vehicle Control (VC), which is information relating to the steering, speed or control of the target vehicle and often relates to manoeuvre execution
Vehicle Information (VI), which is advisory information. This can include information about hardware capabilities, which may be exchanged once between the vehicle control system and the interface in both the source and target vehicles. Vehicle Information may also include information that is exchanged more frequently due to dynamic changes in the source and target vehicles, the level of autonomy currently enabled, status, telemetry etc.
User Data (UD), which is data created by or intended for the user. User data encompasses infotainment and multimedia data. The interface may thus operate as a general portal into the vehicle by handling any kind of data from the communication system and not just data relating to vehicle functionality and communication services.

and also data that is exchanged between the application software and the interface such as:

Connection Management (CM)
QoS Enforcement (QE)
Reliability Feedback (RF)

The left-hand side of FIG. 6 represents a message exchange for a source vehicle (603). The right-hand side of FIG. 6 represents a message exchange for a target vehicle. The base station 605 is configured to run an ITS application that communicates with the ITS applications in each of the respective vehicles.

Figure 7:
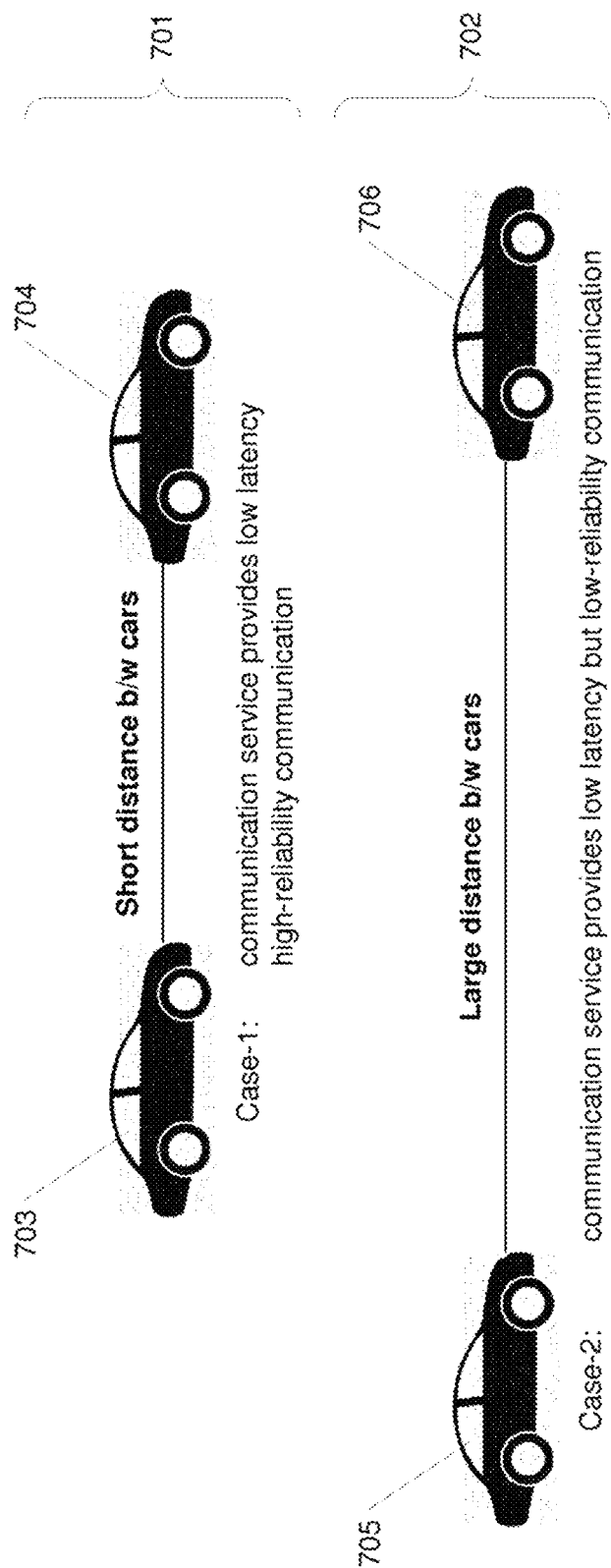
FIG. 7 shows two example scenarios in which a vehicle control system is allocated communication resources.

FIG. 7 shows an example of a scenario in which the communication system tailors the communication resources it provides to a vehicle control system to the specific situation of that vehicle. The upper portion (701) shows one vehicle 703 that is close to another 704. This is a safety critical scenario since a communication failure could potentially lead to the two vehicles crashing due to the non-communication of safety-critical information. The communication system consequently allocates the rear vehicle 703 a communication service that provides low latency, high reliability communication. The lower portion 702 shows one vehicle 705 which is relatively far from another vehicle 706. Although it is still important that data is communicated quickly, as the situation may change, the risk of collision is smaller than in scenario 701 due to the larger distance between the vehicles. The communication system consequently allocates the rear vehicle 705 a communication service that still provides low latency but at low reliability. The communication system is thus able to allocate communication resources efficiently where they are most needed, rather than being restricted to strict quality of service requirements even in situations where they are not required.

The vehicle control system preferably receives feedback from the communication system about what it can provide in-terms of quality of service (which covers factors such as latency, reliability, packet loss, availability, frequency of message delivery etc) so that it can adapt its own functionality accordingly. For example, in the scenario shown in the lower portion 702 of FIG. 7 the vehicle control system may determine that the distance between the cars should be maintained or even increased until the reliability of the communication service that the communication system provides improves. Vehicular safety is continuously and constantly determined with a vehicular subsystem periodically reporting its safety and reliability status to the vehicle control system. The communication system is preferably configured to report periodically to the vehicle control system in a similar way, e.g. by periodically reporting its communication reliability, safety (in terms of network load), and availability (in terms of service requests such as ability to meet reliability and latency targets), achievable QoS and other KPIs. The vehicle control system uses this information to determine the safety of the vehicle, e.g. in terms of functions that are available to the vehicle control system.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

What is claimed is:

1. An interface entity for interfacing between a vehicle control system of a vehicle and a communication system, the interface entity comprising:
    an input configured to receive data from one of the vehicle control system or the communication system;
    a processor configured to translate the data into translated data having a format that is comprehensible to the other of the vehicle control system or the communication system; and
    an output configured to output the translated data to the other of the vehicle control system or the communication system,
    wherein the input is configured to receive vehicle data from the vehicle control system that defines a function that the vehicle control system intends to perform, and wherein the processor is further configured to:

translate the vehicle data into a requirement for one or more communication resources of the communication system, wherein the requirement comprises a quality of service for the one or more communication resources that is dependent on the function that the vehicle control system intends to perform; and cause vehicle control of the vehicle to be updated in response to the one or more communication resources having parameters that do not meet the requirement for the quality of service, wherein updating the vehicle control of the vehicle comprises changing a speed or a direction of the vehicle and/or increasing a distance between the vehicle and another vehicle or road object.

2. The interface entity as claimed in claim 1, wherein the one or more communication resources include one or more of resource scheduling, priority handling, or a mode of transmission.

3. The interface entity as claimed in claim 1, wherein the processor is further configured to generate a request for the one or more communication resources, and
wherein the output is further configured to output the request to the communication system.

4. The interface entity as claimed in claim 1, wherein the input is further configured to receive communication data from the communication system, wherein the communication data includes one or more key performance indicators relating to a connectivity status of the communication system.

5. The interface entity as claimed in claim 1, wherein the interface entity is further configured to facilitate a bidirectional exchange of information between the vehicle control system and the communication system.

6. A vehicle control system, comprising:
an interface configured to:
transmit data associated with a vehicle via a communication system, and
receive data about a connectivity status of the communication system; and
a processor configured to make a determination about an operation of the vehicle based on the data about the connectivity status of the communication system,
wherein the interface is further configured to:
cause a communication resource to be requested from the communication system based on an intention that the vehicle control system perform a function, wherein a requirement of the communication resource comprises a quality of service for the communication resource that is dependent on the function that the vehicle control system intends to perform; and
cause vehicle control of the vehicle to be updated in response to the communication resource having parameters that do not meet the requirement for the quality of service, wherein updating the vehicle control of the vehicle comprises changing a speed or a direction of the vehicle and/or increasing a distance between the vehicle and another vehicle or road object.

7. The vehicle control system as claimed in claim 6, wherein the interface is configured to receive data that defines a current and predicted future connectivity status of the communication system, and
wherein the processor is further configured to make an assessment about an expected future safety of the vehicle based on the data that defines the current and predicted future connectivity status of the communication system.

8. The vehicle control system as claimed in claim 6, further comprising a controller configured to enable or disable a functionality of the vehicle control system based on the determination about the operation of the vehicle.

9. The vehicle control system as claimed in claim 6, further comprising a controller configured to adjust control of the vehicle based on the determination about the operation of the vehicle.

10. The vehicle control system as claimed in claim 6,
wherein the processor is further configured to predict an expected path of the vehicle, and
wherein the interface is further configured to transmit the expected path to the communication system.

11. A network device configured to facilitate data communication with a vehicle control system of a vehicle, the network device comprising:
a non-transitory machine readable storage medium storing instructions; and
a processor configured to execute the instructions to cause the network device to:
determine a predicted future connectivity status of a communication system comprising the network device;
forward the predicted future connectivity status of the communication system to the vehicle control system;
receive data from the vehicle control system;
determine a requirement of the vehicle control system for one or more communication resources from the communication system based on the data, wherein the requirement comprises a quality of service for the one or more communication resources that is dependent on a function that the vehicle control system intends to perform;
allocate the one or more communication resources of the communication system to the vehicle control system based on the requirement of the vehicle control system; and
cause vehicle control of the vehicle to be updated in response to the one or more communication resources having parameters that do not meet the requirement for the quality of service, wherein updating the vehicle control of the vehicle comprises changing a speed or a direction of the vehicle and/or increasing a distance between the vehicle and another vehicle or road object.

12. The network device as claimed in claim 11, wherein executing the instructions further causes the network device to receive data from the vehicle control system that includes one or more of a request from the vehicle control system for the one or more communication resources, a current or predicted operation of the vehicle, a position of the vehicle, or an expected future path of the vehicle.

* * * * *